UNITED STATES PATENT OFFICE.

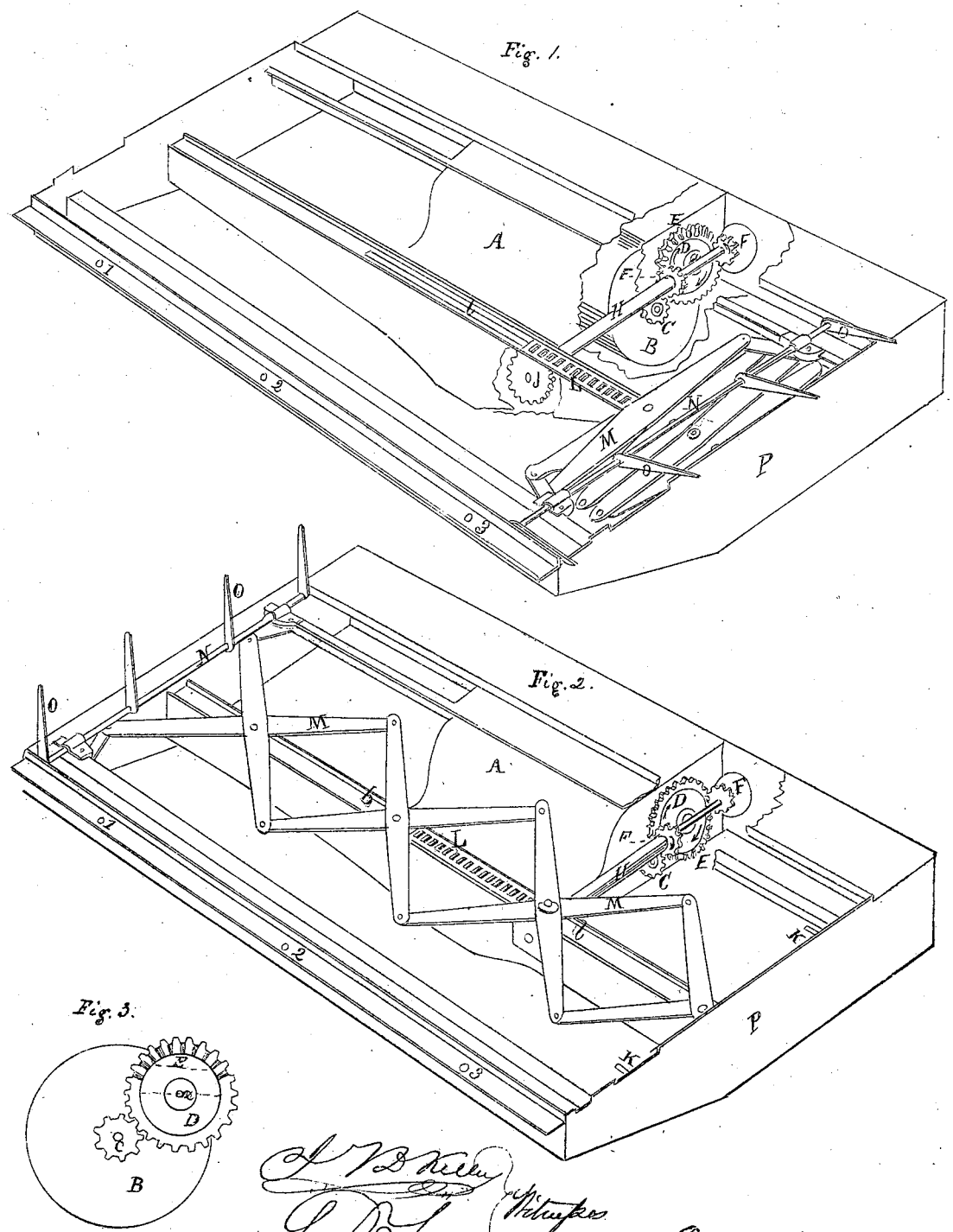

ISAAC VAN DOREN, OF SOMERVILLE, NEW JERSEY.

IMPROVEMENT IN RAKES FOR HARVESTERS.

Specification forming part of Letters Patent No. 19,523, dated March 2, 1858.

*To all whom it may concern:*

Be it known that I, ISAAC VAN DOREN, of Somerville, Somerset county, and State of New Jersey, have invented a new and Improved Rake for Harvesters, which is self-acting, or which is operated entirely independent of the driving-wheel or the working parts of the machine; and I do hereby declare that the following is a full, clear, and exact description thereof and of its mode of operation, reference being had to the accompanying drawings, and to the letters of reference marked thereon, making a part of this specification.

Figure 1 is a view of the rake drawn back toward or next to the machine, and showing the position of the working parts when the rake is so situated. Fig. 2 is a view of the position of the working parts when the rake is extended. Fig. 3 is a detached view of the principal operating-wheels.

The nature of my invention consists in so constructing a rake, in combination with the platform supporting it, and for attachment to harvesters, that the rake shall have and receive all necessary motion from the supporting-wheel of the platform, and without any connection with the driving-wheel or the other parts of the machine, the rake thus being wholly independent and self-acting and self-operating, thus dispensing with all mechanism or gearing to connect the rake with the machine.

In harvesters as heretofore constructed, and which have used a rake of any sort not worked by hand, the power to operate such rake has been derived from the driving-wheel or other parts of the machine, and consequently special and additional mechanism or gearing has been required for such purpose, which of course becomes useless whenever the platform and rake are detached, and the machine changed into a mower. By my invention, however, the rake is complete within itself and self-acting, and no such connecting mechanism nor gearing is necessary, and the platform and rake have only to be attached to or detached from the sickle-beam to change the machine to a harvester or to a mower. The mechanism required to operate the rake is also very simple and not liable to get out of order, and is entirely within the platform and not liable to become broken or injured.

In all harvesters the platform to catch the grain as cut necessarily requires a carrying or supporting wheel of some kind. I avail myself of such wheel and of its natural motion to obtain the necessary power to operate the rake, and transfer such power by the mechanism hereinafter described.

In Figs. 1 and 2, A represents that part of the under side of the platform covering the supporting wheel or roller B, such platform being partly broken away in Fig. 1 to show more plainly the connection of the mechanism with such roller. Upon the axle B, projected through the end of A, I place a small pinion, C, which plays or works into the larger wheel, D, attached to the inside at *a*. As the roller B revolves it carries the pinion C and gives continual motion to the larger wheel, D, in the direction indicated by the arrows upon it. This wheel D has also upon its side or face a geared arc or section, E, as seen more plainly in Fig. 3. Such geared or toothed arc does not extend around nor cover the whole of the wheel D, but covers less than one-half of its side periphery or circumference, as seen in Fig. 3, and is made of such an extent that as one of the small pinions, F', on the shaft H leaves or passes out of gear with one end of such toothed arc E the other wheel, F, will gear into the opposite end. The effect of this arrangement is that while the wheel D has continued motion in but one direction it gives, by means of the geared arc E and the pinions F and F', revolution to the shaft H alternately in opposite directions, the pinions F and F' being fixed to the shaft H. This is apparent by reference to the drawings. In Fig. 1 the arc E is seen just in contact with the pinion F, which will of course, by the action of the wheel D, be made to revolve in the direction of the arrow marked upon it, carrying the shaft H with it. As soon as the wheel D has revolved so as to carry the geared arc E to the position shown in Fig. 2 such arc leaves the pinion F and gears into the pinion F' and revolves it in the direction of the arrow upon it, reversing the motion of the shaft H, and these movements are continually repeated, revolving the shaft H alternately in opposite directions. The pinions F and F' are made of such a size that a revolution shall correspond with the required sweep of the rake or the length of the sickle-beam. To the other end of the shaft H is attached a toothed wheel, J, which works into a flat geared plate, L, resting on the frame $l$, and fastened to the expanding levers M, which carry the rake N. Of course, as the shaft H is revolved alternately in opposite directions, the levers M, through the wheel and plate J L, will be alternately expanded and contracted and the rake N operated. As the levers are expanded and the rake takes the position shown in Fig. 2 the lower ends of the teeth O, or of one or more of them, strike against projections on the side of the platform or trips K K, arranged for such purpose, and are thrown up, as represented, so as to carry back with them whatever may be on the platform P, which is also covered in any convenient manner. The platform and rake are bolted or screwed to the sickle-beam at 1, 2, and 3.

What I claim as my invention, and desire to secure by Letters Patent, is—

1. The arrangement or combination of the geared wheel D, having spur and face gearing, as described, and shaft H, with its pinions F F' J, in connection with the supporting-roller B and expanding levers M, substantially as described, for the purpose of operating the rake N by the roller B.

2. In connection with the rake N, when operated, as described, by means of expanding levers M, the trips K K, for the purpose of throwing the teeth in a vertical position to carry the grain from the platform.

ISAAC VAN DOREN.

Witnesses:
J. V. D. KELLEY,
S. D. LAW.